United States Patent
Ho et al.

(10) Patent No.: US 10,871,602 B1
(45) Date of Patent: Dec. 22, 2020

(54) BACKLIGHT MODULE

(71) Applicant: CHICONY POWER TECHNOLOGY CO., LTD., New Taipei (TW)

(72) Inventors: Hsuan-Wei Ho, New Taipei (TW); Yueh-Heng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/886,220

(22) Filed: May 28, 2020

(30) Foreign Application Priority Data

Sep. 27, 2019 (TW) .............................. 108135258 A (51) Int. Cl.
*F21V 8/00* (2006.01)
*H01H 13/705* (2006.01)

(52) U.S. Cl.
CPC ......... *G02B 6/0016* (2013.01); *G02B 6/0055* (2013.01); *G02B 6/0061* (2013.01); *H01H 13/705* (2013.01); *H01H 2219/036* (2013.01)

(58) Field of Classification Search
CPC .. G02B 6/0016; G02B 6/0055; G02B 6/0061; G02B 6/0075; G02B 6/0076; G02B 1/133603; G02B 1/133606; H01H 13/83; H01H 13/705; H01H 2219/036; H01H 2219/062

See application file for complete search history.

(56) References Cited

U.S. PATENT DOCUMENTS

| | | | |
|---|---|---|---|
| 7,239,303 B2 | 7/2007 | Liao et al. | |
| 7,423,229 B2* | 9/2008 | Chen | G02B 6/005 |
| | | | 200/314 |
| 8,770,772 B1* | 7/2014 | Zhang | H01H 13/83 |
| | | | 362/23.03 |
| 9,983,346 B2 | 5/2018 | Chen | |
| 2008/0037277 A1* | 2/2008 | Yamaguchi | G02B 6/0081 |
| | | | 362/611 |
| 2013/0234943 A1* | 9/2013 | Zhang | G06F 3/0202 |
| | | | 345/168 |
| 2020/0043681 A1* | 2/2020 | Chen | G06F 1/169 |

FOREIGN PATENT DOCUMENTS

| | | |
|---|---|---|
| CN | 204332779 U | 5/2015 |
| TW | 200834179 A | 8/2008 |
| TW | 200933201 A | 8/2009 |
| TW | M426806 U | 4/2012 |
| TW | M432082 U | 6/2012 |
| TW | M497846 U | 3/2015 |

* cited by examiner

*Primary Examiner* — Peggy A Neils
(74) *Attorney, Agent, or Firm* — Muncy, Geissler, Olds & Lowe, P.C.

(57) ABSTRACT

A backlight module is disclosed. The backlight module includes a light emitting component, a first light guide plate and a second light guide plate. The first light guide plate is disposed above the light emitting component and includes a first hole located correspondingly to the light emitting component. The second light guide plate is disposed between the light emitting component and the first light guide plate and includes a second hole. The second hole is located corresponding to the light emitting component and communicates with the first hole. The diameter of the second hole is greater than the diameter of the first hole.

19 Claims, 6 Drawing Sheets

(Prior Art)

BACKLIGHT MODULE

BACKGROUND OF THE INVENTION

1. Field of the Invention

The present invention relates to a backlight module; more particularly, the present invention relates to a direct-lit type backlight module capable of improving the overall uniformity of illumination by means of a special design for laminating light guide plates.

2. Description of the Related Art

A backlight module is an assembly used for providing a point, line or surface light source, and such modules are widely applied to electronic devices such as displays or illuminated keyboards. Please refer to FIG. 1, which illustrates a conventional direct-lit type backlight module 500. The backlight module 500 includes a circuit board 510, a light emitting component 520 and a light guide plate 530, wherein the light emitting component 520 is disposed on the circuit board 510, and the light guide plate 530 is disposed above the light emitting component 520. When the backlight module 500 is applied to a keyboard, a plurality of key caps 600 are disposed above the light guide plate 530.

Figure 1:
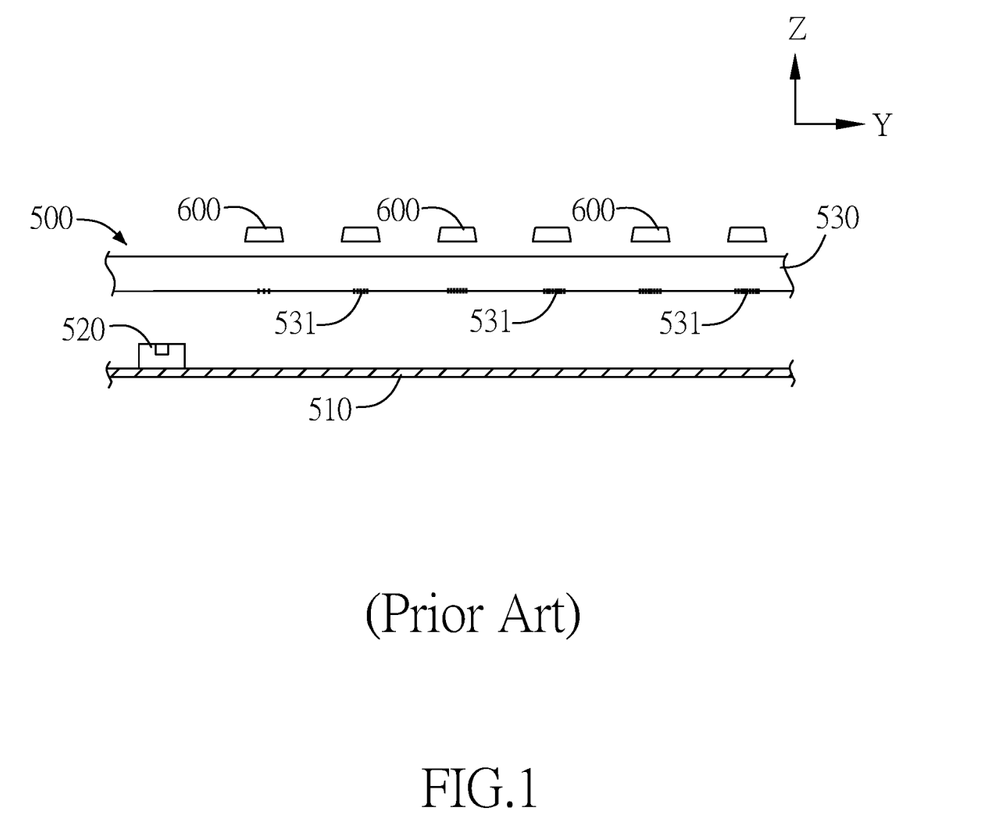
FIG. 1 illustrates a lateral cross section view of a conventional direct-lit type backlight module.

In order to reduce the manufacturing cost of an illuminated keyboard, generally one single light emitting component 520 is employed for supplying the light required for lighting up multiple key caps 600. However, the luminous intensity of the light emitted from the light emitting component 520 is attenuated as the light transmission distance increases, which results in inconsistent illumination of the key caps 600 due to differences in the distances from the light emitting component 520, so the overall illumination of the keyboard is uneven.

To solve this problem, an existing solution is to dispose different densities of dots 531 on the lower surface of the light guide plate 530 according to their distances from the light emitting component 520. As shown in FIG. 1, at farther distances from the light emitting component 520, the dots 531 are disposed at higher densities. As such, the overall illumination of the keyboard can reach consistency. However, due to limitations of the manufacturing process of the light guide plate 530, if the density of the dots 531 reaches a certain upper limit, the density of the dots 531 cannot be increased further to compensate for the distance from the light emitting component 520.

SUMMARY OF THE INVENTION

It is an object of the present invention to provide a direct-lit type backlight module capable of improving the overall uniformity of illumination by means of a special design for laminating light guide plates.

To achieve the abovementioned object, the backlight module of the present invention comprises a light emitting component, a first light guide plate and a second light guide plate. The first light guide plate is disposed above the light emitting component. The first light guide plate includes a first light receiving surface, a first hole and a first inner peripheral surface surrounding the first hole. The first light receiving surface faces toward the light emitting component, and the first hole is located corresponding to the light emitting component. The second light guide plate is disposed between the light emitting component and the first light guide plate. The second light guide plate includes a second light receiving surface, a second hole and a second inner peripheral surface surrounding the second hole. The second light receiving surface faces toward the light emitting component, and the second hole is located corresponding to the light emitting component and communicates with the first hole. The diameter of the second hole is greater than the diameter of the first hole, such that a portion of the first light receiving surface protrudes above the second inner peripheral surface, thereby enabling light emitted from the light emitting component to enter the first light guide plate via the portion of the first light receiving surface, and to enter the second light guide plate via the second light receiving surface.

According to another embodiment of the present invention, the backlight module of the present invention comprises a light emitting component, a first light guide plate and a second light guide plate. The first light guide plate is disposed above the light emitting component. The first light guide plate includes a first light receiving surface, a first hole and a first inner peripheral surface surrounding the first hole. The first light receiving surface faces toward the light emitting component, and the first hole is located corresponding to the light emitting component. The second light guide plate is disposed between the light emitting component and the first light guide plate. The second light guide plate includes a second light receiving surface, a second hole and a second inner peripheral surface surrounding the second hole. The second light receiving surface faces toward the light emitting component, and the second hole is located corresponding to the light emitting component and communicates with the first hole. The spatial volume surrounded by the second inner peripheral surface is greater than the spatial volume surrounded by the first inner peripheral surface, such that a portion of the first light receiving surface protrudes above the second inner peripheral surface, thereby enabling light emitted from the light emitting component to enter the first light guide plate via the portion of the first light receiving surface, and to enter the second light guide plate via the second light receiving surface.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 2:
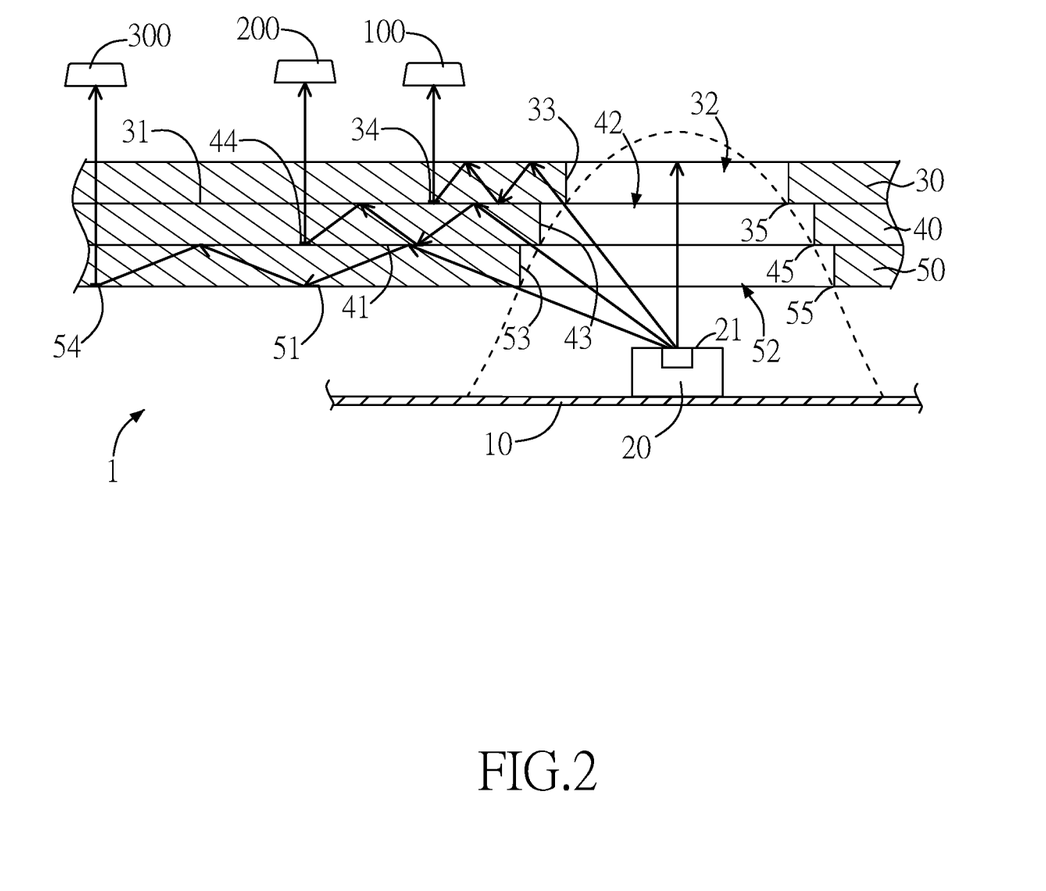
FIG. 2 illustrates a lateral cross section view of a backlight module according to a first embodiment of the present invention.

Please refer to FIG. 2, which illustrates a lateral cross section view of a backlight module according to a first embodiment of the present invention.

As shown in FIG. 2, in the first embodiment of the present invention, the backlight module 1 of the present invention is applied to a keyboard device. The keyboard device is disposed above the backlight module 1 and comprises a first key cap 100, a second key cap 200 and a third key cap 300. The backlight module 1 comprises a circuit board 10, a light emitting component 20, a first light guide plate 30, a second light guide plate 40 and a third light guide plate 50.

In the first embodiment of the present invention, the light emitting component 20 can be, but is not limited to, a light emitting diode (LED) disposed on the circuit board 10 for emitting light according to power supplied by a power source (not shown in figures). The light emitting component 20 includes a light emitting surface 21, which faces toward the keyboard device. When the light emitting component 20 emits light, light is emitted from the light emitting surface 21, wherein the light perpendicular to the light emitting surface 21 is the optical axis.

In the first embodiment of the present invention, the first light guide plate 30 is disposed above the light emitting component 20. The first light guide plate 30 comprises a first light receiving surface 31, a first hole 32, a first inner peripheral surface 33 surrounding the first hole 32, a first light spot portion 34 disposed on the first light receiving surface 31 and used for preventing total reflection, and a first ridge line 35 located at an intersection of the first light receiving surface 31 and the first inner peripheral surface 33. The first light receiving surface 31 faces toward the light emitting component 20. The first hole 32 is located corresponding to the light emitting component 20. The first light spot portion 34 is located corresponding to the first key cap 100.

In the first embodiment of the present invention, the second light guide plate 40 is laminated with the first light guide plate 30 and is disposed between the light emitting component 20 and the first light guide plate 30. The second light guide plate 40 comprises a second light receiving surface 41, a second hole 42, a second inner peripheral surface 43 surrounding the second hole 42, a second light spot portion 44 disposed on the second light receiving surface 41 and used for preventing total reflection, and a second ridge line 45 located at an intersection of the second light receiving surface 41 and the second inner peripheral surface 43. The second light receiving surface 41 faces toward the light emitting component 20. The second hole 42 is located corresponding to the light emitting component 20 and communicates with the first hole 32. The diameter of the second hole 42 is greater than the diameter of the first hole 32, such that the spatial volume surrounded by the second inner peripheral surface 43 is greater than the spatial volume surrounded by the first inner peripheral surface 33; as a result, a portion of the first light receiving surface 31 protrudes above the second inner peripheral surface 43. The second light spot portion 44 is located corresponding to the second key cap 200.

In the first embodiment of the present invention, the third light guide plate 50 is laminated with the second light guide plate 40 and is disposed between the light emitting component 20 and the second light guide plate 40. That is, the second light guide plate 40 is disposed between the first light guide plate 30 and the third light guide plate 50. The third light guide plate 50 comprises a third light receiving surface 51, a third hole 52, a third inner peripheral surface 53 surrounding the third hole 52, a third light spot portion 54 disposed on the third light receiving surface 51 and used for preventing total reflection, and a third ridge line 55 located at an intersection of the third light receiving surface 51 and the third inner peripheral surface 53. The third light receiving surface 51 faces toward the light emitting component 20. The third hole 52 is located corresponding to the light emitting component 20 and communicates with the second hole 42 and the first hole 32. The diameter of the third hole 52 is greater than the diameter of the second hole 42, such that the spatial volume surrounded by the third inner peripheral surface 53 is greater than the spatial volume surrounded by the second inner peripheral surface 43; as a result, a portion of the second light receiving surface 41 protrudes above the third inner peripheral surface 53. The third light spot portion 54 is located corresponding to the third key cap 300.

As shown in FIG. 2, when light is emitted from the light emitting surface 21, the light enters the first light guide plate 30 via the portion of the first light receiving surface 31 protruding above the second inner peripheral surface 43, enters the second light guide plate 40 via the portion of the second light receiving surface 41 protruding above the third inner peripheral surface 53, and enters the third light guide plate 50 via the third light receiving surface 51.

After the light enters the first light guide plate 30, the second light guide plate 40 and the third light guide plate 50, the light is transmitted in the form of total reflection within the first light guide plate 30, the second light guide plate 40 and the third light guide plate 50. When the light respectively reaches the first light spot portion 34, the second light spot portion 44 and the third light spot portion 54, the first light spot portion 34, the second light spot portion 44 and the third light spot portion 54 respectively alter the reflection angle of the light to prevent total reflection, thereby changing the transmission direction of the light. In this embodiment, the direction of the light which reaches the first light spot portion 34 is changed to pass through the first light guide plate 30 to illuminate the first key cap 100; the direction of the light which reaches the second light spot portion 44 is changed to pass through the second light guide plate 40 to illuminate the second key cap 200; and the direction of the light which reaches the third light spot portion 54 is changed to pass through the third light guide plate 50 to illuminate the third key cap 300.

In this embodiment, because the angle of the light entering the third light receiving surface 51 (which means the angle between the direction of the light and the normal which is perpendicular to the third light receiving surface 51) is larger than all the others, it has the largest angle upon total reflection transmission. Therefore, the energy exhaustion upon total reflection transmission is effectively reduced by means of utilizing the third light spot portion 54 of the third light guide plate 50 to guide the light to the third key cap 300, which is located farthest from the light emitting component 20. Similarly, because the distance between the second key cap 200 and the light emitting component 20 is longer than the distance between the first key cap 100 and the light emitting component 20, the energy exhaustion of the total reflection is reduced by means of utilizing the second light spot portion 44 of the second light guide plate 40 to guide the light to the second key cap 200 (because the angle of the light entering the portion of the second light receiving surface 41 protruding above the third inner peripheral surface 53 is relatively larger than the angle of the light entering the portion of the first light receiving surface 31 protruding above the second inner peripheral surface 43), and utilizing the first light spot portion 34 of the first light guide plate 30 to guide the light to the first key cap 100. By means of utilizing the light guide plate located closer to the light emitting component 20 to illuminate a key cap located farther away from the light emitting component 20, the energy exhaustion of total reflection transmission within the light guide plate is effectively reduced, thereby increasing the illumination of the keyboard device. However, please note that the scope of the present invention is not limited to the above design.

In the first embodiment of the present invention, the first hole 32, the second hole 42 and the third hole 52 are all circular-shaped and concentric along the same vertical line (i.e., the optical axis of the light emitting component 20). Because the diameter of the first hole 32 is smaller than the diameter of the second hole 42, and the diameter of the second hole 42 is smaller than the diameter of the third hole 52, the spatial shape jointly surrounded and formed by the first inner peripheral surface 33, the second inner peripheral surface 43 and the third inner peripheral surface 53 (i.e., the spatial shape jointly formed by the first hole 32, the second hole 42 and the third hole 52) is in the form of a wide-bottomed and narrow-topped tower, and the spatial shape matches the spatial distribution pattern (i.e., light pattern) of the luminous intensity of the light emitting component 20. In other words, the paraboloid formed by linking the first ridge line 35, the second ridge line 45 and the third ridge line 55 matches the spatial distribution pattern of the luminous intensity of the light emitting component 20 (as shown by the dotted line in FIG. 2). Accordingly, the present invention can ensure that each of the light guide plates 30, 40 and 50 can receive light of the same or similar intensity, thereby optimizing the uniformity of illumination of the keyboard device. However, please note that the scope of the present invention is not limited to the above description. Furthermore, in this embodiment, the light pattern of the light emitting component 20 generally, without limiting the scope of the present invention, matches with a Lambertian scattering model or a Gaussian distribution model.

Please note that in other embodiments, the number of the light guide plates of the present invention is not limited to be three as described above. In order to achieve a better light allocation effect or to compensate for a keyboard device having a special specification, it is also possible to dispose a fourth light guide plate, a fifth light guide plate, or even more light guide plates. Or, it is also possible to dispose only the first light guide plate 30 and the second light guide plate 40 to illuminate the keyboard device via more light spot portions.

Figure 3:
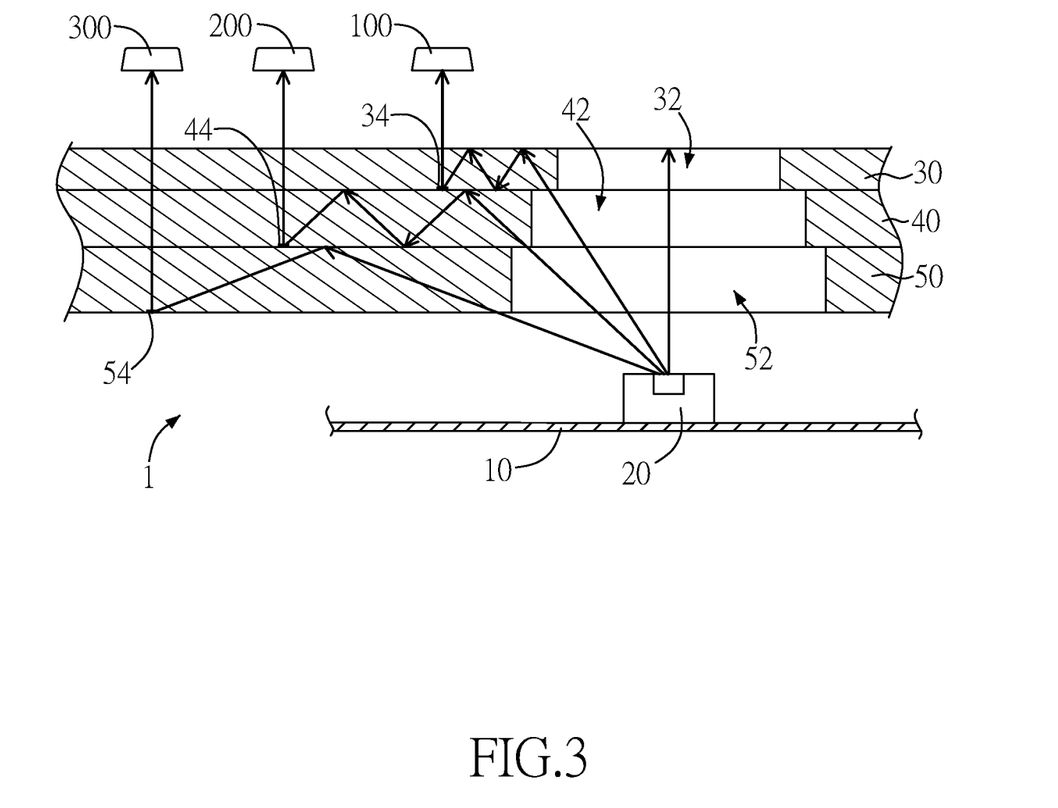
FIG. 3 illustrates a lateral cross section view of the backlight module according to a second embodiment of the present invention.

Please refer to FIG. 3, which illustrates a lateral cross section view of the backlight module according to a second embodiment of the present invention.

As shown in FIG. 3, the major difference between the second embodiment and the abovementioned first embodiment of the present invention is that the first light guide plate 30, the second light guide plate 40 and the third light guide plate 50 have different thicknesses in the second embodiment. The light guide plate closer to the light emitting component 20 has a greater thickness. Therefore, the thickness of the third light guide plate 50 is greater than the thickness of the second light guide plate 40, and the thickness of the second light guide plate 40 is greater than the thickness of the first light guide plate 30. As shown in FIG. 2 and FIG. 3, the light within the third light guide plate 50 in FIG. 2 reaches the third light spot portion 54 through three times of total reflection, whereas the light within the third light guide plate 50 in FIG. 3 reaches the third light spot portion 54 through only one time of total reflection. Therefore, as the thickness of the light guide plate increases, the number of total reflections of the light transmitted within the light guide plate can be reduced, thereby facilitating long-distance transmission. As a result, according to the above-mentioned design, the backlight module 1 can provide more even illumination.

Figure 4:
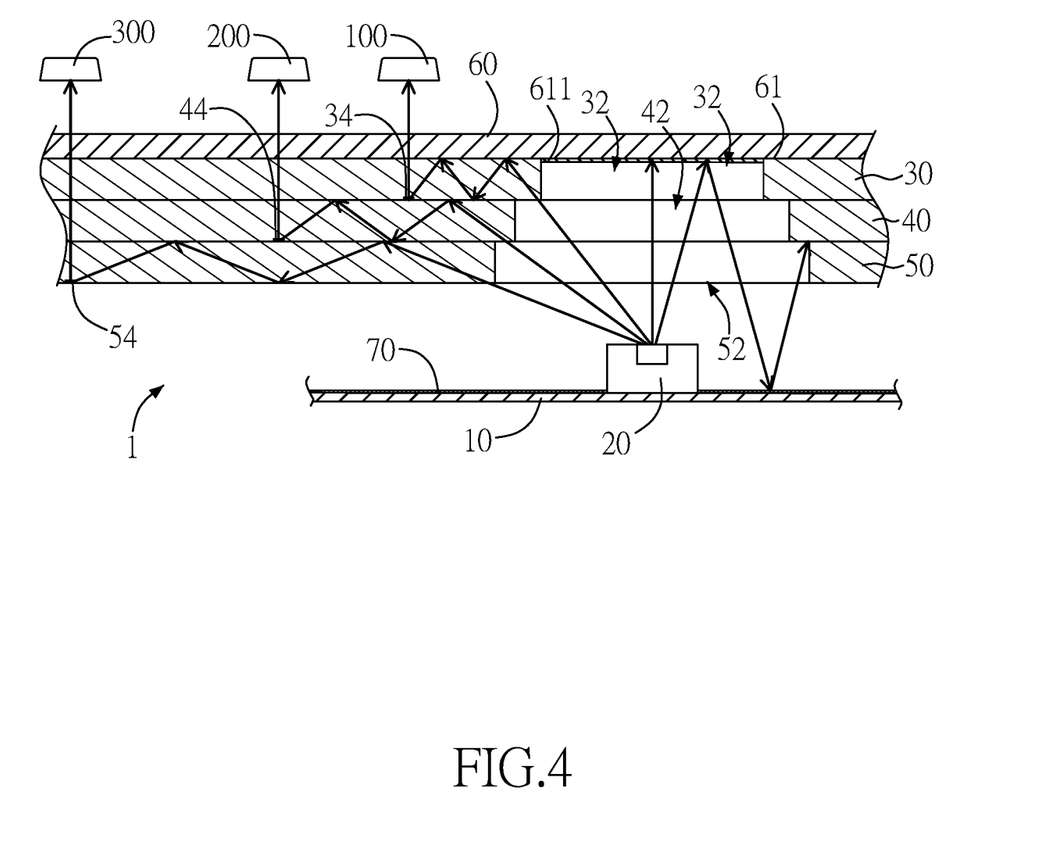
FIG. 4 illustrates a lateral cross section view of the backlight module according to a third embodiment of the present invention.

Please refer to FIG. 4, which illustrates a lateral cross section view of the backlight module according to a third embodiment of the present invention.

As shown in FIG. 4, in the third embodiment of the present invention, the backlight module 1 comprises a circuit board 10, a light emitting component 20, a first light guide plate 30, a second light guide plate 40, a third light guide plate 50, a top board 60 and a reflector 70. In this embodiment, the structures, arrangements and functions of the circuit board 10, the light emitting component 20, the first light guide plate 30, the second light guide plate 40 and the third light guide plate 50 are all as described in the first embodiment; therefore, there is no need for further description. The top board 60 is disposed above the first light guide plate 30 and covers the first hole 32, and the top board 60 further includes a light receiving surface 61 facing toward the light emitting component 20. In this embodiment, the light receiving surface 61 of the top board 60 includes a reflection portion 611. The reflection portion 611 is located corresponding to the first hole 32 and is used for reflecting the light emitted from the light emitting component 20 to the reflection portion 611. In a specific embodiment, the reflection portion 611 can be implemented by means of, but not limited to, coating or printing a silver coating layer or a white coating layer on the light receiving surface 61. The reflector 70 is disposed above the circuit board 10 and is used for reflecting the light, and the reflector 70 has a breaking hole for accommodating the light emitting component 20.

As shown in FIG. 4, the reflection portion 611 of the top board 60 is utilized to cover the first hole 32 such that light having a relatively smaller angle deviating from the optical axis is reflected to the reflector 70, and the light is reflected back to the first light guide plate 30, the second light guide plate 40 and the third light guide plate 50 via the reflector 70. The light utilization ratio of the light emitting component 20 is thus improved, so the overall luminance of the backlight module 1 is increased.

Figure 5:
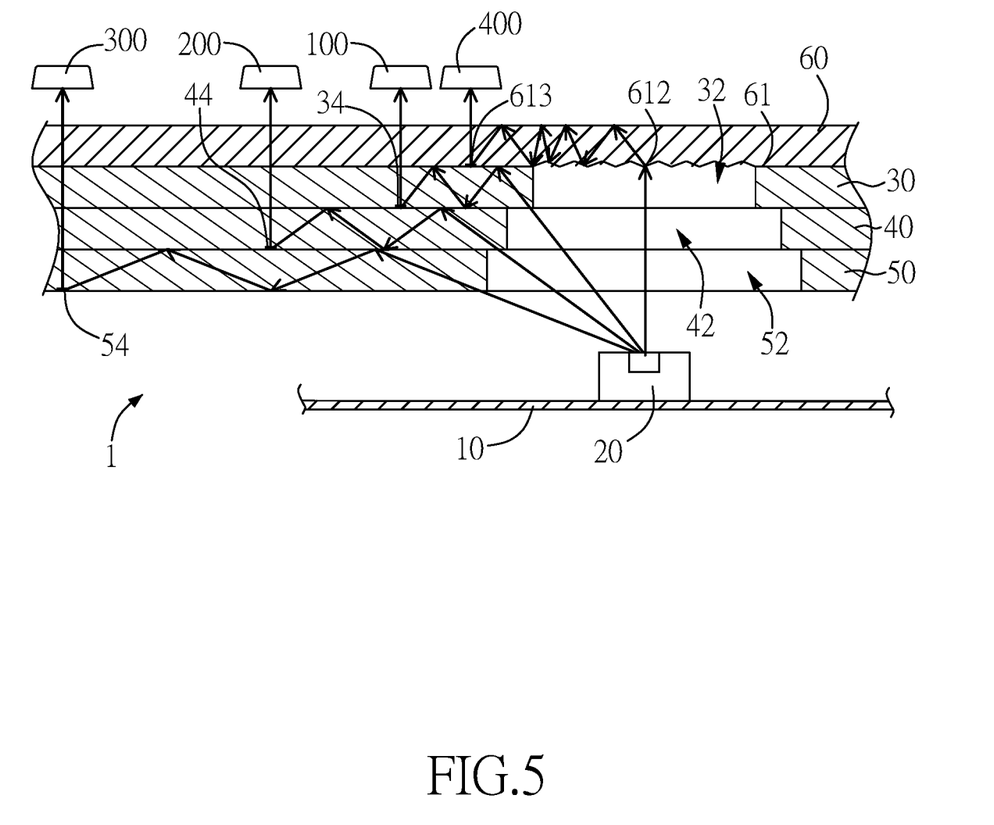
FIG. 5 illustrates a lateral cross section view of the backlight module according to a fourth embodiment of the present invention.

Please refer to FIG. 5, which illustrates a lateral cross section view of the backlight module according to a fourth embodiment of the present invention.

As shown in FIG. 5, the major difference between the fourth embodiment and the abovementioned third embodiment of the present invention is that the keyboard device in the fourth embodiment further comprises a fourth key cap 400. The distance between the fourth key cap 400 and the light emitting component 20 is shorter than the distance between the first key cap 100 and the light emitting component 20. The top board 60 is a light transparent light guide sheet. The light receiving surface 61 of the top board 60 includes a light scattering portion 612 having a zigzag-shaped (or a wave-shaped) structure and a top board light spot portion 613. Further, in this embodiment, there is no need to dispose the reflector 70 in the backlight module 1.

The light scattering portion 612 is located corresponding to the first hole 32. The light scattering portion 612 is used for scattering the light emitted from the light emitting component 20 to the light scattering portion 612 to enter the top board 60 (i.e., the fourth light guide plate). After the light enters the top board 60, the light can be transmitted within the top board 60 in the form of total reflection, similarly. Further, when the light reaches the top board light spot portion 613, the top board light spot portion 613 alters the reflection angle of the light in order to prevent total reflection to change the transmission direction of the light, so the direction of the light which reaches the top board light spot portion 613 is changed to pass through the top board 60 (i.e., the fourth light guide plate) to illuminate the fourth key cap 400. Therefore, in this embodiment, by means of disposing the light transparent top board 60 (i.e., the fourth light guide plate) above the first light guide plate 30, light traveling with a relatively smaller angle of deviation from the optical axis can be effectively utilized and the overall luminance of the backlight module 1 is thereby improved.

Figure 6:
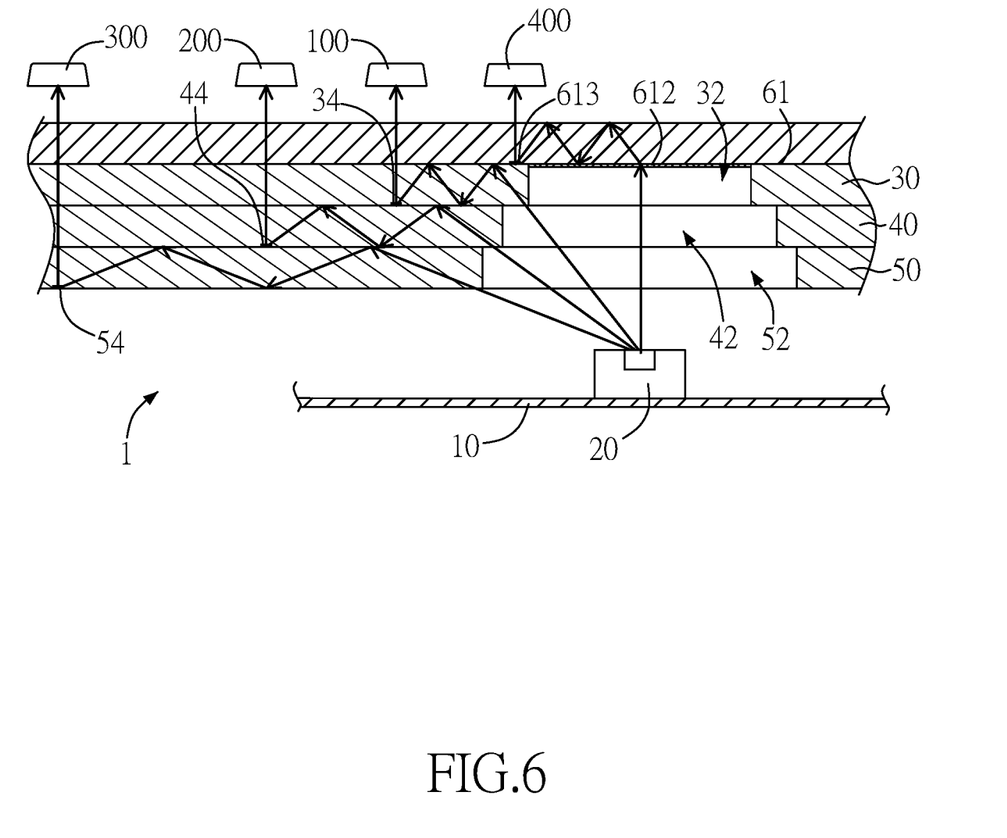
FIG. 6 illustrates a lateral cross section view of the backlight module according to a fifth embodiment of the present invention.

Finally, please refer to FIG. 6, which illustrates a lateral cross section view of the backlight module according to a fifth embodiment of the present invention.

As shown in FIG. 6, the major difference between the fifth embodiment and the abovementioned fourth embodiment of the present invention is that the light scattering portion 612 in the fifth embodiment is not a zigzag-shaped (or wave-shaped) structure; instead, the light scattering portion 612 is implemented by means of coating a layer with scattering materials on the light receiving surface 61 of the top board 60. Accordingly, the light emitted from the light emitting portion 20 to the light scattering portion 612 can enter the top board 60 (i.e., the fourth light guide plate), similarly.

According to the abovementioned embodiments, by means of stacking multiple light guide plates and disposing holes of different sizes or forming different spatial volumes, the backlight module 1 of the present invention can guide the light emitted from the light emitting component to be allocated to key caps located at different distances via different light guide plates. Because the energy exhaustion of the light is reduced before each of the light respectively entering the different light guide plates reaches the light spot portion (or a so-called "dot portion") disposed on the respective light guide plate, the present invention can still achieve an illumination effect with enough intensity by means of disposing a relatively lower intensity of light spot portions with respect to the key cap having a longer light distance, thereby effectively solving the problems of the known prior art.

Although the present invention has been explained in relation to its preferred embodiments, it is to be understood that many other possible modifications and variations can be made without departing from the spirit and scope of the invention as hereinafter claimed.

What is claimed is:

1. A backlight module, comprising:
    a light emitting component;
    a first light guide plate, disposed above the light emitting component, the first light guide plate comprising a first light receiving surface, a first hole and a first inner peripheral surface surrounding the first hole, wherein the first light receiving surface faces toward the light emitting component, and the first hole is located corresponding to the light emitting component; and
    a second light guide plate, disposed between the light emitting component and the first light guide plate, the second light guide plate comprising a second light receiving surface, a second hole and a second inner peripheral surface surrounding the second hole, wherein the second light receiving surface faces toward the light emitting component, and the second hole is located corresponding to the light emitting component and communicates with the first hole, where the diameter of the second hole is greater than the diameter of the first hole, such that a portion of the first light receiving surface protrudes above the second inner peripheral surface, thereby enabling light emitted from the light emitting component to enter the first light guide plate via the portion of the first light receiving surface, and to enter the second light guide plate via the second light receiving surface.

2. The backlight module as claimed in claim 1, wherein a paraboloid formed by a first ridge line and a second ridge line matches the spatial distribution pattern of the luminous intensity of the light emitting component, where the first ridge line is located at an intersection of the first light receiving surface and the first inner peripheral surface, and the second ridge line is located at an intersection of the second light receiving surface and the second inner peripheral surface.

3. The backlight module as claimed in claim 1, further comprising a third light guide plate, disposed between the light emitting component and the second light guide plate, the third light guide plate comprising a third light receiving surface, a third hole and a third inner peripheral surface surrounding the third hole, wherein the third light receiving surface faces toward the light emitting component, and the third hole is located corresponding to the light emitting component and communicates with the second hole and the first hole, where the diameter of the third hole is greater than the diameter of the second hole, such that a portion of the second light receiving surface protrudes above the third inner peripheral surface, thereby enabling the light emitted from the light emitting component to enter the first light guide plate via the portion of the first light receiving surface, to enter the second light guide plate via the portion of the second light receiving surface, and to enter the third light guide plate via the third light receiving surface.

4. The backlight module as claimed in claim 1, wherein the backlight module is applicable to a keyboard device comprising a first key cap and a second key cap, and the first key cap and the second key cap are located above the first light guide plate, the first light guide plate further comprises a first light spot portion disposed on the surface of the first light guide plate and used for preventing total reflection so as to enable the light entering the first light spot portion to be illuminated onto the first key cap, and the second light guide plate further comprises a second light spot portion disposed on the surface of the second light guide plate and used for preventing total reflection so as to enable the light entering the second light spot portion to be illuminated onto the second key cap, and the distance between the first key cap and the light emitting component is shorter than the distance between the second key cap and the light emitting component.

5. The backlight module as claimed in claim 4, wherein the thickness of the first light guide plate is smaller than the thickness of the second light guide plate.

6. The backlight module as claimed in claim 1, further comprising a top board, disposed above the first light guide plate and covering the first hole, the top board comprising a light receiving surface facing toward the light emitting component.

7. The backlight module as claimed in claim 2, further comprising a top board, disposed above the first light guide plate and covering the first hole, the top board comprising a light receiving surface facing toward the light emitting component.

8. The backlight module as claimed in claim 3, further comprising a top board, disposed above the first light guide plate and covering the first hole, the top board comprising a light receiving surface facing toward the light emitting component.

9. The backlight module as claimed in claim 4, further comprising a top board, disposed above the first light guide plate and covering the first hole, the top board comprising a light receiving surface facing toward the light emitting component.

10. The backlight module as claimed in claim 5, further comprising a top board, disposed above the first light guide plate and covering the first hole, the top board comprising a light receiving surface facing toward the light emitting component.

11. The backlight module as claimed in claim 6, wherein the top board is a light guide sheet, the light receiving surface comprises a light scattering portion, and the light scattering portion is located corresponding to the first hole and is used for enabling the light emitted from the light emitting component to the light scattering portion to scatter into the light guide sheet.

12. The backlight module as claimed in claim 7, wherein the top board is a light guide sheet, the light receiving surface comprises a light scattering portion, and the light scattering portion is located corresponding to the first hole and is used for enabling the light emitted from the light emitting component to the light scattering portion to scatter into the light guide sheet.

13. The backlight module as claimed in claim 8, wherein the top board is a light guide sheet, the light receiving surface comprises a light scattering portion, and the light scattering portion is located corresponding to the first hole and is used for enabling the light emitted from the light emitting component to the light scattering portion to scatter into the light guide sheet.

14. The backlight module as claimed in claim 9, wherein the top board is a light guide sheet, the light receiving surface comprises a light scattering portion, and the light scattering portion is located corresponding to the first hole and is used for enabling the light emitted from the light emitting component to the light scattering portion to scatter into the light guide sheet.

15. The backlight module as claimed in claim 10, wherein the top board is a light guide sheet, the light receiving surface comprises a light scattering portion, and the light scattering portion is located corresponding to the first hole and is used for enabling the light emitted from the light emitting component to the light scattering portion to scatter into the light guide sheet.

16. A backlight module, comprising:
a light emitting component;
a first light guide plate, disposed above the light emitting component, the first light guide plate including a first light receiving surface, a first hole and a first inner peripheral surface surrounding the first hole, wherein the first light receiving surface faces toward the light emitting component, and the first hole is located corresponding to the light emitting component; and
a second light guide plate, disposed between the light emitting component and the first light guide plate, the second light guide plate including a second light receiving surface, a second hole and a second inner peripheral surface surrounding the second hole, wherein the second light receiving surface faces toward the light emitting component, and the second hole is located corresponding to the light emitting component and communicates with the first hole, where the spatial volume surrounded by the second inner peripheral surface is greater than the spatial volume surrounded by the first inner peripheral surface, such that a portion of the first light receiving surface protrudes above the second inner peripheral surface, thereby enabling light emitted from the light emitting component to enter the first light guide plate via the portion of the first light receiving surface, and to enter the second light guide plate via the second light receiving surface.

17. The backlight module as claimed in claim 16, wherein a spatial shape jointly formed by the first hole and the second hole matches the spatial distribution pattern of the luminous intensity of the light emitting component.

18. The backlight module as claimed in claim 16, further comprising a top board, disposed above the first light guide plate and covering the first hole, the top board comprising a light receiving surface facing toward the light emitting component.

19. The backlight module as claimed in claim 17, wherein the light receiving surface comprises a reflection portion, which is located corresponding to the first hole and used for reflecting the light emitted from the light emitting component to the reflection portion.

* * * * *